US012683426B2

(12) United States Patent　(10) Patent No.:　US 12,683,426 B2
Ghodke et al.　(45) Date of Patent:　Jul. 14, 2026

(54) METHOD AND SYSTEM TO CONTROL MULTIPLE SOURCES OF ENERGY USING AN UNINTERRUPTIBLE POWER SUPPLY

(71) Applicant: SCHNEIDER ELECTRIC IT CORPORATION, Foxboro, MA (US)

(72) Inventors: Ajit Ashok Ghodke, Pune (IN); Uday Prakashrao Mhaskar, Pune (IN)

(73) Assignee: SCHNEIDER ELECTRIC IT CORPORATION, Foxboro (MA)

( * ) Notice: Subject to any disclaimer, the term of this patent is extended or adjusted under 35 U.S.C. 154(b) by 0 days.

(21) Appl. No.: 18/969,933

(22) Filed: Dec. 5, 2024

(65) Prior Publication Data

US 2025/0096594 A1　Mar. 20, 2025

Related U.S. Application Data

(63) Continuation of application No. 17/820,606, filed on Aug. 18, 2022, now Pat. No. 12,191,706, which is a
(Continued)

(30) Foreign Application Priority Data

Jan. 29, 2020　(IN) ............................ 202011003985

(51) Int. Cl.
　　*H02J 9/06*　　(2006.01)
　　*H02M 3/04*　　(2006.01)
(52) U.S. Cl.
　　CPC .............. *H02J 9/061* (2013.01); *H02M 3/04* (2013.01)

(58) Field of Classification Search
　　CPC ........ H02J 9/061; H02J 1/102; H02J 2300/30; H02J 7/35; H02J 9/062; H02M 3/04; H02M 5/4585; H02M 1/10; Y02B 10/70
(Continued)

(56) References Cited

U.S. PATENT DOCUMENTS 8,227,937 B2　7/2012　Barlock et al.
11,171,486 B2　11/2021　Milivojevic et al.
(Continued)

OTHER PUBLICATIONS

Brochure, Luminous, Solar NXT PCU, 3 pages, retreived Jan. 27, 2021.
(Continued)

*Primary Examiner* — Richard Tan
(74) *Attorney, Agent, or Firm* — FIG. 1 Patents

(57) ABSTRACT
A power supply system including an uninterruptible power supply (UPS) comprising an input coupled to an AC source and configured to receive input AC power from the AC source and an output configured to provide AC output power to a load, the UPS including a converter coupled to the input, an inverter coupled to the output, and a DC bus coupled between the converter and the inverter, a renewable power source configured to provide DC power derived from a renewable energy source, a first DC/DC converter coupled between the renewable power source and the DC bus and configured to provide DC power derived from the renewable power source to the DC bus, and a controller in communication with the first DC/DC converter and configured to monitor an output power capability of the renewable power source, and to operate the first DC/DC converter to provide DC power derived from the renewable power source to the DC bus based on the output power capability of the renewable power source.

20 Claims, 4 Drawing Sheets

Related U.S. Application Data continuation of application No. 17/159,848, filed on Jan. 27, 2021, now Pat. No. 11,456,617.

(58) Field of Classification Search

USPC .......................................................... 307/52

See application file for complete search history.

(56) References Cited

U.S. PATENT DOCUMENTS

| | | | |
|---|---|---|---|
| 11,456,617 B2 | 9/2022 | Ghodke et al. | |
| 2008/0217998 A1 | 9/2008 | Parmley | |
| 2008/0278003 A1 | 11/2008 | Pouchet et al. | |
| 2011/0278931 A1 | 11/2011 | Johnson, Jr. | |
| 2013/0264865 A1 | 10/2013 | Sugeno et al. | |
| 2016/0172900 A1 | 6/2016 | Welch, Jr. | |
| 2017/0194791 A1 | 7/2017 | Budde | |
| 2019/0067989 A1 | 2/2019 | Beg | |
| 2021/0249896 A1* | 8/2021 | Panfil | H02J 9/061 |

OTHER PUBLICATIONS

Web Page, Buy Solar Solutions and Solar Products Online at Best Price in India / Luminous India, 23 pages, https://www.luminousindia.com/solar-products.html [retreived on Jan. 27, 2021].

\* cited by examiner

METHOD AND SYSTEM TO CONTROL MULTIPLE SOURCES OF ENERGY USING AN UNINTERRUPTIBLE POWER SUPPLY

CROSS-REFERENCE TO RELATED APPLICATION

This application is a Continuation of U.S. application Ser. No. 17/820,606, filed on Aug. 18, 2022, which is a Continuation of U.S. application Ser. No. 17/159,848 [now U.S. Pat. No. 11,456,617], filed on Jan. 27, 2021, which claims the benefit under 35 U.S.C. § 119 of Indian patent application Ser. No. 20/201,1003985 filed on Jan. 29, 2020. Each application referenced above is hereby incorporated herein by reference in its entirety for all purposes.

BACKGROUND

1. Field of Invention

The present disclosure relates generally to uninterruptible power supplies (UPS).

2. Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPS's, off-line UPS's, line interactive UPS's as well as others. On-line UPS's provide conditioned AC power as well as back-up AC power upon interruption of a primary source of AC power. Off-line UPS's typically do not provide conditioning of input AC power, but do provide back-up AC power upon interruption of the primary AC power source. Line interactive UPS's are similar to off-line UPS's in that they switch to battery power when a blackout occurs but also typically include a multi-tap transformer for regulating the output voltage provided by the UPS.

SUMMARY

At least one aspect of the present disclosure is directed to a power supply system including an uninterruptible power supply (UPS) comprising an input coupled to an AC source and configured to receive input AC power from the AC source and an output configured to provide AC output power to a load, the UPS including a converter coupled to the input, an inverter coupled to the output, and a DC bus coupled between the converter and the inverter, a renewable power source configured to provide DC power derived from a renewable energy source, a first DC/DC converter coupled between the renewable power source and the DC bus and configured to provide DC power derived from the renewable power source to the DC bus, and a controller in communication with the first DC/DC converter and configured to monitor an output power capability of the renewable power source, and to operate the first DC/DC converter to provide DC power derived from the renewable power source to the DC bus based on the output power capability of the renewable power source.

In one embodiment, the controller is configured to monitor availability of the input AC power, determine that the input AC power is unavailable, and to operate, in response to determining that the input AC power is unavailable, the first DC/DC converter to provide the DC power derived from the renewable power source to the DC bus. In some embodiments, the controller is configured to monitor load demand at the output, to determine that the DC power provided by the first DC/DC converter to the DC bus is insufficient to power the load, and to operate, in response to determining that the DC power provided by the first DC/DC converter to the DC bus is insufficient to power the load, the converter to provide DC power derived from the input AC power to the DC bus to supplement the DC power provided to the DC bus by the first DC/DC converter.

In various embodiments, the power supply system includes a bypass line coupled between the input and the output, the bypass line including a bypass relay to selectively couple the input to the output. In one embodiment, the controller is configured to determine that the DC power provided by the first DC/DC converter to the DC bus is in excess of a level sufficient to power the load, and to operate, in response to determining that the DC power provided by the first DC/DC converter to the DC bus is in excess of the level sufficient to power the load, the bypass relay to couple the input to the output such that excess AC power, derived from the DC power provided by the first DC/DC converter to the DC bus, is provided to the input.

In some embodiments, the power supply system includes an energy storage device coupled to the first DC/DC converter. In various embodiments, the controller is configured to monitor a charge level of the energy storage device, to determine that the energy storage device is at least partially uncharged and that DC power from the renewable power source is unavailable, and to operate, in response to determining that the energy storage device is at least partially uncharged and that the DC power from the renewable power source is unavailable, the first DC/DC converter to provide a first charging current, derived from the input AC power, to the energy storage device, a magnitude of the first charging current based on the load demand.

In one embodiment, the power supply system includes a maximum power point tracking (MPPT) controller coupled to the first DC/DC converter, the renewable power source, and the energy storage device, the MPPT controller configured to provide maximum power point tracking information of the renewable power source to the controller and to provide DC power derived from the renewable power source to the first DC/DC converter and the energy storage device. In some embodiments, the controller is configured to determine that the energy storage device is at least partially uncharged and that DC power from the renewable power source is available, and to operate, in response to determining that the energy storage device is at least partially uncharged and that DC power from the renewable power source is available, the first DC/DC converter to provide a second charging current derived from at least one of the input AC power and the renewable power source to the energy storage device, a magnitude of the second charging current based on the maximum power point tracking information and the load demand. In various embodiments, the controller is configured to determine that the energy storage device is fully charged, and to operate, in response to determining that the energy storage device is fully charged, the first DC/DC converter and the MPPT controller to provide DC power derived from the renewable power source to the DC bus. In various embodiments, the controller is configured to determine that the input AC power is unavailable and the DC power provided by the MPPT controller is insufficient to power the load, and to operate, in response to a determination that the input AC power is unavailable and the DC power provided by the MPPT controller is insufficient to power the load, the first DC/DC converter to derive DC power from the energy storage device to supplement the power provided by the MPPT controller.

In one embodiment, the power supply system includes an energy storage device, and a second DC/DC converter coupled between the DC bus and the energy storage device. In some embodiments, the controller is configured to monitor a charge level of the energy storage device, to determine that the energy storage device is at least partially uncharged and that DC power from the renewable power source is unavailable, and to operate, in response to determining that the energy storage device is at least partially uncharged and that the DC power from the renewable power source is unavailable, the second DC/DC converter to provide a first charging current, derived from the input AC power, to the energy storage device, a magnitude of the first charging current based on the load demand. In various embodiments, the controller is configured to determine that the energy storage device is at least partially uncharged and that DC power from the renewable power source is available, and to operate, in response to determining that the energy storage device is at least partially uncharged and that DC power from the renewable power source is available, the second DC/DC converter to provide a second charging current derived from at least one of the input AC power and the renewable power source to the energy storage device, a magnitude of the second charging current based on the output power capability of the renewable power source and the load demand.

In some embodiments, the controller is configured to determine that the input AC power is unavailable and the DC power provided by the first DC/DC converter is insufficient to power the load, and to operate, in response to a determination that the input AC power is unavailable and the DC power provided by the first DC/DC converter is insufficient to power the load, the second DC/DC converter to provide DC power derived from the energy storage device to the DC bus to supplement the DC power provided to the DC bus by the first DC/DC converter. In one embodiment, the power supply system includes an alternate power source coupled to the DC bus via a third DC/DC converter, the alternate power source being configured to provide DC power derived from an alternate energy source. In various embodiments, the controller is configured to monitor the availability of the input AC power and the load demand, to determine that the input AC power is unavailable and that the DC power provided by the first DC/DC converter to the DC bus is insufficient to power the load, and to operate, in response to determining that the input AC power is unavailable and that the DC power provided by the first DC/DC converter is insufficient to power the load, the third DC/DC converter to provide DC power derived from the alternate power source to the DC bus to supplement the DC power provided to the DC bus by the first DC/DC converter.

Another aspect of the disclosure is directed to a non-transitory computer-readable medium storing thereon sequences of computer-executable instructions for controlling an Uninterruptible Power Supply (UPS) comprising an input coupled to an AC source and configured to receive input AC power from the AC source and an output configured to provide output AC power to a load, the UPS including a converter coupled to the input, an inverter coupled to the output, and a DC bus coupled between the converter and the inverter. The sequences of computer-executable instructions include instructions that instruct at least one processor to monitor an output power capability of a renewable power source configured to provide DC power derived from a renewable energy source, and operate a first DC/DC converter to provide DC power derived from the renewable power source to the DC bus based on the output power capability of the renewable power source.

In one embodiment, the sequences of instructions include instructions that cause the at least one processor to monitor an availability of the input AC power, and operate, in response to a determination that the input AC power is unavailable, the first DC/DC converter to provide the DC power derived from the renewable power source to the DC bus. In some embodiments, the sequences of instructions include instructions that cause the at least one processor to monitor load demand at the output, and operate, in response to a determination that the DC power provided by the first DC/DC converter to the DC bus is insufficient to power the load, the converter to provide DC power derived from the input AC power to the DC bus to supplement the DC power provided to the DC bus by the first DC/DC converter. In various embodiments, the sequences of instructions include instructions that cause the at least one processor to operate, in response to a determination that the DC power provided by the first DC/DC converter to the DC bus is in excess of a level sufficient to power the load, a bypass relay to couple the input to the output such that excess AC power, derived from the DC power provided by the first DC/DC converter to the DC bus, is provided to the input.

In one embodiment, the sequences of instructions include instructions that cause the at least one processor to monitor a charge level of an energy storage device coupled to the first DC/DC converter, and operate, in response to a determination that the energy storage device is at least partially uncharged and that DC power from the renewable power source is unavailable, the first DC/DC converter to provide a first charging current, derived from the input AC power, to the energy storage device, a magnitude of the first charging current based on the load demand. In some embodiments, the sequences of instructions include instructions that cause the at least one processor to receive maximum power point tracking (MPPT) information corresponding to the renewable power source from an MPPT controller coupled to the first DC/DC converter, the renewable power source, and the energy storage device, and operate the MPPT controller to provide DC power derived from the renewable power source to the first DC/DC converter and the energy storage device. In various embodiments, the sequences of instructions include instructions that cause the at least one processor to operate, in response to a determination that the energy storage device is at least partially uncharged and that DC power from the renewable power source is available, the first DC/DC converter to provide a second charging current derived from at least one of the input AC power and the renewable power source to the energy storage device, a magnitude of the second charging current based on the maximum power point tracking information and the load demand.

In some embodiments, the sequences of instructions include instructions that cause the at least one processor to operate, in response to a determination that the energy storage device is fully charged, the first DC/DC converter and the MPPT controller to provide DC power derived from the at least one renewable power source to the DC bus. In various embodiments, the sequences of instructions include instructions that cause the at least one processor to operate, in response to a determination that the input AC power is unavailable and the DC power provided by the MPPT controller is insufficient to power the load, the first DC/DC converter to derive DC power from the energy storage device to supplement the power provided by the MPPT controller.

In one embodiment, the sequences of instructions include instructions that cause the at least one processor to monitor a charge level of an energy storage device, and operate, in response to a determination that the energy storage device is at least partially uncharged and that DC power from the renewable power source is unavailable, a second DC/DC converter coupled between the DC bus and the energy storage device to provide a first charging current, derived from the input AC power, to the energy storage device, a magnitude of the first charging current based on the load demand. In some embodiments, the sequences of instructions include instructions that cause the at least one processor to operate, in response to a determination that the energy storage device is at least partially uncharged and that DC power from the at least one renewable power source is available, the second DC/DC converter to provide a second charging current derived from at least one of the input AC power and the renewable power source to the energy storage device, a magnitude of the second charging current based on the output power capability of the renewable power source and the load demand.

In various embodiments, the sequences of instructions include instructions that cause the at least one processor to operate, in response to a determination that the input AC power is unavailable and the DC power provided by the first DC/DC converter is insufficient to power the load, the second DC/DC converter to derive DC power from the energy storage device to supplement the power provided by the first DC/DC converter. In one embodiment, the sequences of instructions include instructions that cause the at least one processor to operate, in response to a determination that the input AC power is unavailable and the DC power provided by the first DC/DC converter is insufficient to power the load, a third DC/DC converter coupled to the DC bus to derive DC power from an alternate power source to supplement the power provided by the first DC/DC converter, the alternate power source being configured to provide DC power derived from an alternate energy source.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, power devices, such as uninterruptible power supplies (UPS), are oftentimes used to provide regulated, uninterrupted power to sensitive and/or critical loads. An online UPS rectifies input AC power provided by an electric utility (e.g., a power grid) using a Power Factor Correction circuit (PFC) to provide DC power to at least one DC bus. The rectified DC power on the DC bus is used to charge a battery while mains power is available. In the absence of mains power, the battery discharges and provides DC power to the DC buses. From the DC power on the DC bus, an inverter generates an AC output voltage that is provided to a load. Since the DC bus is powered either by mains or the battery, the output power of the UPS is uninterrupted if the mains fails and the battery is sufficiently charged. Online UPS's may also operate in a bypass mode where unconditioned power with basic protection is provided directly from an AC power source to a load via a bypass line.

Figure 1:
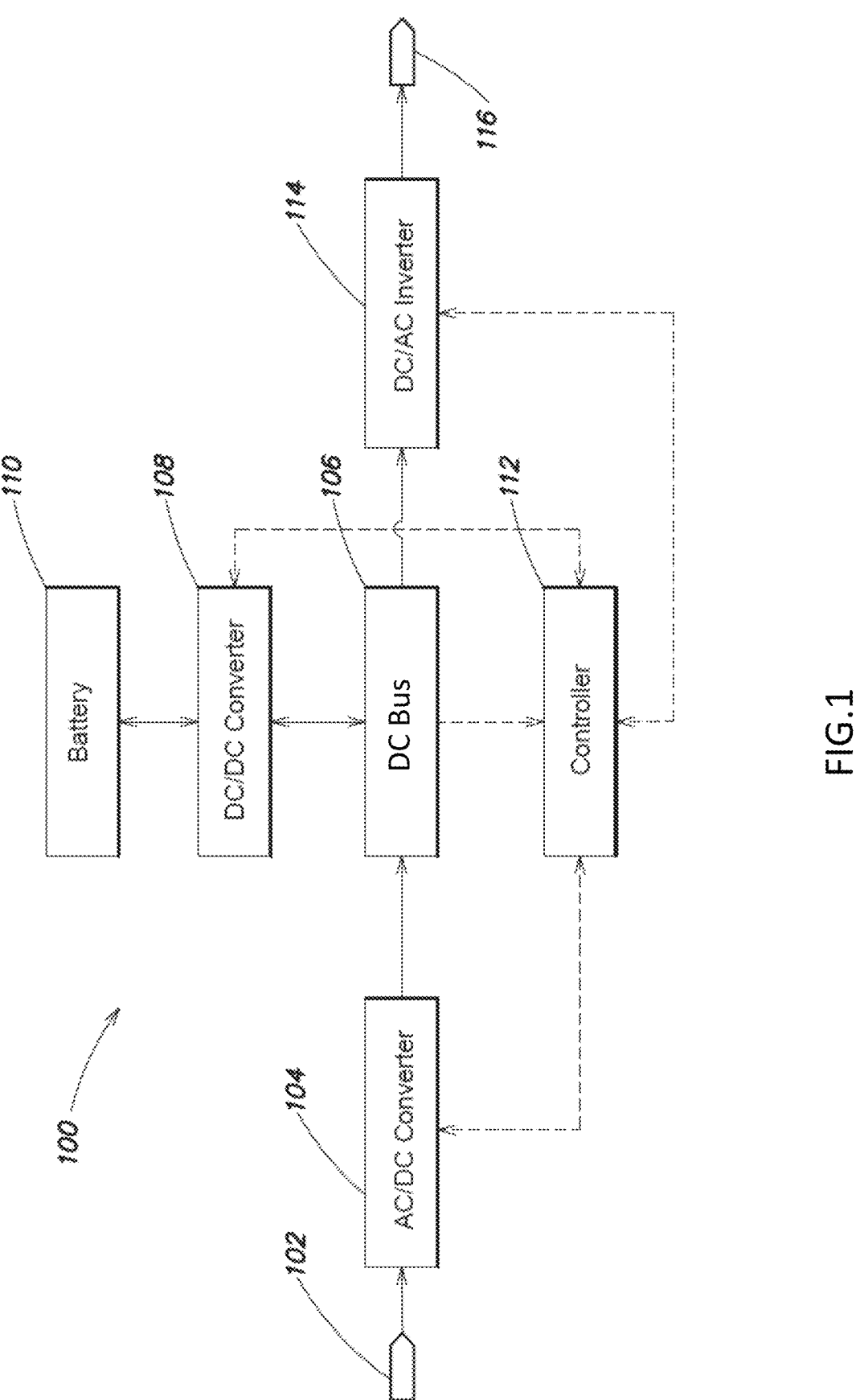
FIG. 1 is a schematic diagram of a UPS according to aspects described herein.

As discussed above, many Uninterruptible Power Supplies (UPSs) include at least one converter module and at least one inverter module. FIG. 1 is a block diagram of an online UPS 100. The UPS 100 includes an input 102, an AC/DC converter 104, a DC bus 106, a DC/DC converter 108, a battery 110, a controller 112, a DC/AC inverter 114, and an output 116. The input 102 is coupled to the AC/DC converter 104 and an AC power source (not pictured), such as an AC mains power supply. The AC/DC converter 104 is coupled to the input 102 and to the DC bus 106, and is communicatively coupled to the controller 112. The DC bus 106 is coupled to the AC/DC converter 104, the DC/DC converter 108, and to the DC/AC inverter 114. The DC/DC converter 108 is coupled to the DC bus 106 and to the battery 110, and is communicatively coupled to the controller 112. The battery 110 is coupled to the DC/DC converter 108. The DC/AC inverter 114 is coupled to the DC bus 106 and to the output 116, and is communicatively coupled to the controller 112. The output 116 is coupled to the DC/AC inverter 114, and to an external load (not shown).

The input 102 is configured to be coupled to an AC mains power source to receive input AC power having an input voltage level. For example, the input 102 may be configured to receive one-phase AC mains power, three-phase AC mains power, or input power having a different number of phases. The UPS 100 is configured to operate in different modes of operation based on the input voltage level of the AC power provided to the input 102. When AC power provided to the input 102 is acceptable, the UPS 100 operates in an online mode of operation.

In the online mode of operation, AC power received at the input 102 is provided to the AC/DC converter 104. The AC/DC converter 104 converts the AC power into DC power and provides the DC power to the DC bus 106. The DC bus 106 distributes the DC power to the DC/DC converter 108 and to the DC/AC inverter 114. The DC/DC converter 108 converts the received DC power and provides the converted DC power to the battery 110 to charge the battery 110. The DC/AC inverter 114 receives DC power from the DC bus 106, converts the DC power into regulated AC power, and provides the regulated AC power to the output 116 to be delivered to a load.

When AC power provided to the input 102 from the AC mains power source is not acceptable (i.e., by having parameters that do not meet specified values) or available, the UPS 100 operates in a backup mode of operation. In the backup mode of operation, DC power is discharged from the battery 110 to the DC/DC converter 108. The DC/DC converter 108 converts the received DC power and provides the DC power to the DC bus 106. The DC bus 106 provides the received power to the DC/AC inverter 114. The DC/AC inverter 114 receives the DC power from the DC bus 106, converts the DC power into regulated AC power, and provides the regulated AC power to the output 116.

During the backup mode of operation, power provided to the DC bus 106 is provided by the battery 110, and during the online mode of operation, power provided to the DC bus 106 is provided by a power source (e.g., a grid) connected to the input 102. Power provided to the DC bus 106 is subsequently drawn by the DC/AC inverter 114 to generate AC power, and to supply the AC power to an external load connected to the output 116.

In some examples, it may be advantageous to utilize an alternate power source (e.g., a renewable power source such as a photovoltaic array) to minimize usage of grid power and reduce energy cost. In one example, the renewable power source may be coupled to the grid at the input 102 of the UPS 100 and power may be drawn from the renewable power source to power the load, charge the battery 110, or backfeed the grid. Due to the intermittent nature of renewable energy sources (e.g., solar, wind, etc.), there are numerous standards that govern the interconnection of renewable power sources to the grid. For example, the IEEE-1547/UL-1741 standard includes coupling renewable power sources to an DC/AC grid-tie inverter and operating the AC/DC grid-tie inverter as a current source against a stiff, constant voltage source (i.e., the grid). As such, according to the IEEE-1547/UL-1741 standard, when power from the grid is unavailable (i.e., no constant voltage source), power may not be drawn from the renewable power source via the AC/DC grid-tie inverter.

Additionally, the renewable power source may be coupled to the AC/DC grid-tie inverter via an intermediate DC/DC converter. As such, power drawn from the renewable power source may experience numerous conversion stages when powering the load or charging the battery. In one example, power drawn from the renewable power source may pass through the intermediate DC/DC converter, the DC/AC grid-tie inverter, the AC/DC converter 104 of the UPS 100, and the DC/AC inverter 114 of the UPS 100 before being provided to the load coupled to the output 116. Likewise, to charge the battery 110, power drawn from the renewable power source may pass through the intermediate DC/DC converter, the DC/AC grid-tie inverter, the AC/DC converter 104 of the UPS 100, and the DC/DC inverter 108 of the UPS 100 before being provided to the battery 110. Such conversion stages may increase loss associated with the power drawn from the renewable power source, reducing efficiency.

Systems and methods are provided herein for improved utilization of renewable power sources with UPS's. In at least one embodiment, power drawn from renewable power sources may be provided directly to the battery or DC bus of a UPS, without a dependence on grid availability. In some embodiments, by providing the power drawn from the renewable power sources directly to the battery or the DC bus, the number of power conversion stages utilized to support the load or charge the battery using power from the renewable power sources may be reduced, improving efficiency.

Figure 2:
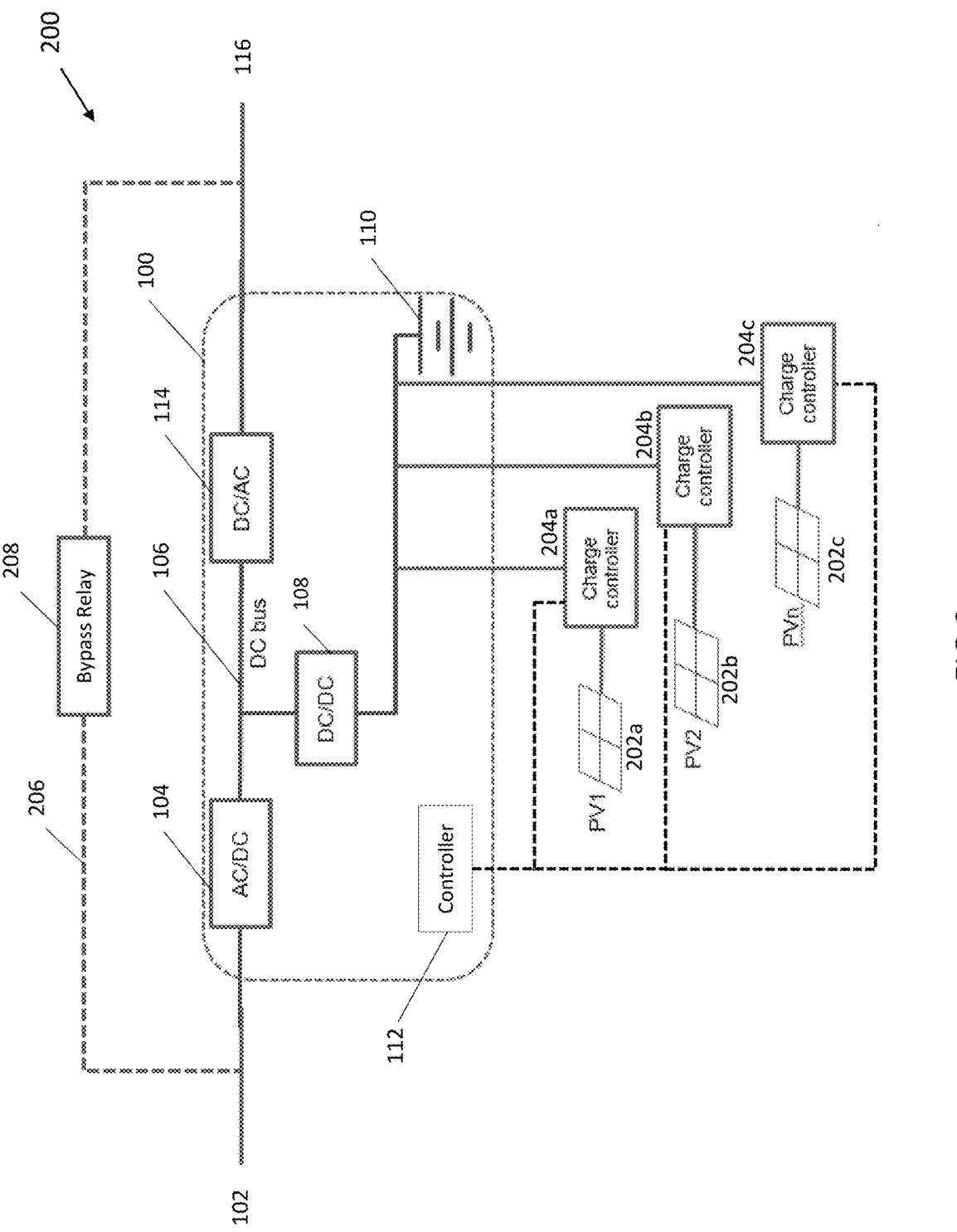
FIG. 2 is a schematic diagram of a power supply system according to aspects described herein.

FIG. 2 illustrates a power supply system 200 in accordance with aspects described herein. The power supply system 200 includes a UPS and at least one renewable power source 202. In some examples, the UPS included in the power system 200 may be the UPS 100 of FIG. 1. As shown, the at least one renewable power source 202 may be coupled between the DC/DC converter 108 and the battery 110 of the UPS 100 via one or more charge controllers 204.

In one example, the power system 200 may include a first renewable power source 202a, a second renewable power source 202b, and a third renewable power source 202c. Likewise, the power system 200 may include a first charge controller 204a, a second charge controller 204b, and a third charge controller 204c corresponding to each of renewable power sources 204a-204c. In some examples, each renewable power source 202a-202c may be a photovoltaic array and the corresponding charge controllers 204a-204c may be maximum power point tracking (MPPT) controllers. The controller 112 may communicate with each charge controller 204a-204c to monitor each renewable power source 202a-202c. In one example, each charge controller 204a-204c may track the maximum power point of its corresponding renewable power source 202a-202c (i.e., the maximum level of power capable of being provided by the renewable power source in view of current environmental conditions) and provide the maximum power point information to the controller 112. As such, the controller 112 may operate each charge controller 204a-204c to draw a desired amount of power from each of the renewable power sources 202a-202c. In some examples, the desired amount of power drawn from each of the renewable power sources 202a-202c may be the maximum amount corresponding to the maximum power point information.

In one example, the controller 112 may monitor the input 102, the output 116, and the battery 110 of the UPS 100 to determine optimal utilization of the DC power drawn from the renewable power sources 202a-202c. For example, when grid power is available and the battery 110 is fully charged, the controller 112 may operate the DC/DC converter 108 such that DC power drawn from the renewable power sources 202a-202c via the charge controllers 204a-204c is provided to the DC bus 106. In some examples, the controller 112 may operate each charge controller 204a-204c such that the maximum amount of DC power is drawn from one or more of the renewable power sources 202a-202d and provided to the DC bus 106. In one example, the DC power drawn from the renewable power sources 202a-202c via the charge controllers 204a-204c may have a first voltage level and the DC/DC converter 108 may convert the first voltage level to a second voltage level (e.g., a DC bus level). The controller 112 may operate the DC/AC inverter 114 such that the DC power provided to the DC bus 106 from the renewable power sources 202a-202c via the DC/DC converter 108 is converted to AC power and provided to the load coupled to the output 116.

In some examples, the controller 112 may monitor the output 116 to determine the power demand of the load (i.e., the load on the DC/AC inverter 114). The controller 112 may compare the maximum power point information received from the charge controllers 204a-204c to the power demand of the load and determine if the renewable power sources 202a-202c are capable of providing a sufficient amount of power to support the load. In other examples, the controller 112 may monitor the DC bus 106 to determine if the power provided by the renewable power sources 202a-202c is sufficient to support the load. For example, the controller 112 may monitor the DC bus 106 for voltage fluctuations indicating an insufficient amount of power is being provided to the load.

In one example, based on an indication that the renewable power sources 202a-202c can provide a sufficient amount of power to support the load, the controller 112 may operate the AC/DC converter 104 of the UPS 100 such that AC power is not drawn from the grid. In some examples, the controller 112 may determine (based on the maximum power point information) that the renewable power sources 202a-202c are capable of providing excess power in addition to what is needed to support the load and the excess power may be fed to the grid. In one example, the power supply system 200 may include an optional bypass line 206 and a bypass relay 208, and the bypass relay 208 may be closed to couple the output 116 to the input 102. The AC/DC converter 104 may be operated such that excess AC power provided to the input 102 via the bypass line 206 is fed back to the grid. In one example, the bypass line 206 and the bypass relay 208 may be included in the UPS 100. Alternatively, based on an indication that the renewable power sources 202a-202c are unable to provide a sufficient amount of power to support the load, the controller 112 may operate the AC/DC converter 104 such that AC power is drawn from the grid, converted to DC power, and provided to the DC bus 106 to supplement the DC power provided from the renewable power sources 202a-202c. In some examples, if the renewable power sources 202a-202c are unavailable, the bypass relay 208 may be closed to couple the input 102 to the output 116 such that unregulated AC power is provided from the grid to support the load.

Further, being that the renewable power sources 202a-202c are coupled to the DC bus 106 via the charge controllers 204a-204c, the DC/AC inverter 114 may function as a constant voltage source allowing DC power to be drawn from the renewable power sources 202a-202c. In some examples, the DC/AC inverter 114 may provide reactive power control of the DC power drawn from the renewable power sources 202a-202c. As such, DC power may be drawn from the renewable power sources 202a-202c without an active connection to the grid. For example, when grid power is unavailable, the controller 112 may still operate the DC/DC converter 108 such that DC power drawn from the renewable power sources 202a-202c via the charge controllers 204a-204c is provided to the DC bus 106. The controller 112 may operate the DC/AC inverter 114 such that the power provided to the DC bus 106 from the renewable power sources 202a-202c via the DC/DC converter 108 is converted to AC power and provided to the load. Based on an indication that the renewable power sources 202a-202c are unable to provide a sufficient amount of power to support the load, the controller 112 may operate the DC/DC converter 108 such that DC power is drawn from the battery 110 and provided to the DC bus 106 to supplement the DC power provided from the renewable power sources 202a-202c.

In some examples, based on an indication that the battery 110 is at least partially uncharged, the controller 112 may operate the DC/DC converter 108 such that a first portion of the DC power drawn from the renewable power sources 202a-202c is provided to the DC bus 106 to support the load and a second portion is provided to the battery 110 for charging. In one example, the battery 110 may include a battery management system, and the controller 112 may control the battery management system of the battery 110 to facilitate charging. For example, the controller 112 may turn on the battery management system to allow DC power drawn from the renewable power sources 202a-202c to charge the battery 110. Likewise, the controller 112 may turn off the battery management system once the battery 110 is fully charged such that all DC power drawn from the renewable power sources 202a-202c is provided to the DC bus 106 via the DC/DC converter 108. If the DC power drawn from the renewable power sources 202a-202c is insufficient to provide a minimum charging current to the battery 110, the controller 112 may operate the DC/DC converter 108 such that DC power (converted from AC grid power) is provided from the DC bus 106 to the battery 110 for charging.

Figure 3:
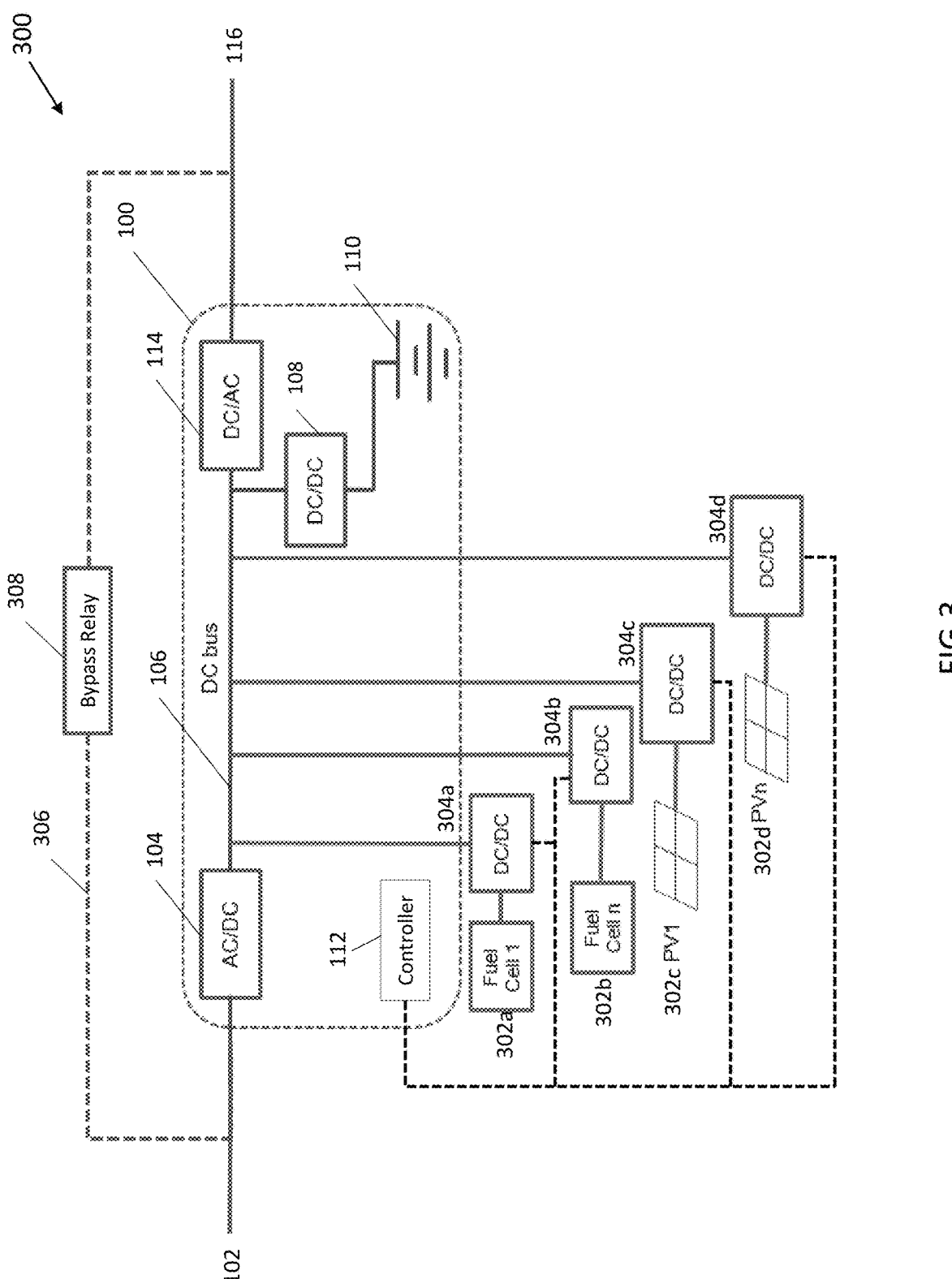
FIG. 3 is a schematic diagram of a power supply system according to aspects described herein.

FIG. 3 illustrates another embodiment of a power supply system 300 in accordance with aspects described herein. In one example, the power supply system 300 may be similar to the power supply system 200 of FIG. 2, except the power supply system 300 includes alternate power sources 302a-302d coupled to the DC bus 106 of the UPS 100. In some examples, the alternate power sources 302a-302d may be coupled to the DC bus 106 via DC/DC converters 304a-304d.

In one example, each alternate power source 302a-302d may be a renewable power source (e.g., a photovoltaic array); however, in some examples, one or more of the alternate power sources 302a-302d may be a different type of power source. For example, alternate power sources 302a and 302b may be non-renewable power sources (e.g., fuel cells) and alternate power sources 302c and 302d may be renewable power sources (e.g., photovoltaic arrays). In other examples, different types and combinations of power sources may be used. Likewise, different types of converters may be used for the DC/DC converters 304a-304d. For example, being that the alternate power sources 302c and 302d are renewable power sources, the DC/DC converters 304c and 304d may be MPPT controllers (similar to the charge controllers 204a-204c of FIG. 2). Likewise, the DC/DC converters 304a and 304b may be a different type of DC/DC converter such as a full bridge or flyback converter.

The controller 112 may communicate with each DC/DC converter 304a-304d to monitor the output power capability of each alternate power source 302a-302d. In some examples, the controller 112 may communicate with one or more interfaces of the alternate power sources 302a-302d directly to monitor output power capability. As such, the controller 112 may operate each DC/DC converter 304a-304d to draw a desired amount of power from each of the alternate power sources 302a-302d. In some examples, the desired amount of power drawn from each of the alternate power sources 302a-302d may be a maximum amount corresponding to output power capability each alternate power source 202a-202d; however, in other examples, the desired amount may be different than the maximum amount.

In one example, the controller 112 may monitor the input 102, the output 116, and the battery 110 of the UPS 100 to determine optimal utilization of the DC power drawn from the alternate power sources 302a-302d. For example, when grid power is available and the battery 110 is fully charged, the controller 112 may operate the DC/DC converters 304a-304d such that DC power drawn from the alternate power sources 302a-302d is provided to the DC bus 106. In some examples, the controller 112 may operate each DC/DC converter 304a-304d such that the maximum amount of DC power is drawn from one or more of the alternate power sources 302a-302d and provided to the DC bus 106. In some examples, the DC power provided from the alternate power sources 302a-302d to the DC/DC converters 304a-304d may have a first voltage level and the DC/DC converters 304a-304d may convert the first voltage level to a second voltage level (e.g., a DC bus level). The controller 112 may operate the DC/AC inverter 114 such that the DC power provided to the DC bus 106 from the alternate power sources 302a-302d is converted to AC power and provided to the load coupled to the output 116.

In some examples, the controller 112 may monitor the output 116 to determine the power demand of the load (i.e., the load on the DC/AC inverter 114). The controller 112 may compare the output power capability of the alternate power sources 302a-302d to the power demand of the load to determine if the alternate power sources 302a-302d are capable of providing a sufficient amount of power to support the load. In other examples, the controller 112 may monitor the DC bus 106 to determine if the power provided by the alternate power sources 302a-302d is sufficient to support the load. For example, the controller 112 may monitor the DC bus 106 for fluctuations indicating an insufficient amount of power is being provided to the load.

In some examples, based on an indication that the alternate power sources 302a-302d can provide a sufficient amount of power to support the load, the controller 112 may operate the AC/DC converter 104 of the UPS 100 such that AC power is not drawn from the grid. In some examples, the controller 112 may determine (based on the output power capability of the alternate power sources 302a-302d) that the alternate power sources 302a-302d are capable of providing excess power in addition to what is sufficient to support the load and the excess power may be fed to the grid. In one example, the power supply system 300 may include a bypass line 306 and a bypass relay 308, and the bypass relay 308 may be closed to couple the output 116 to the input 102. The AC/DC converter 104 may be operated such that excess AC power provided to the input 102 via the bypass line 306 is fed back to the grid. In one example, the bypass line 306 and the bypass relay 308 may be included in the UPS 100. Alternatively, based on an indication that the alternate power sources 302a-302d are unable to provide a sufficient amount of power to support the load, the controller 112 may operate the AC/DC converter 104 such that AC power is drawn from the grid, converted to DC power, and provided to the DC bus 106 to supplement the DC power provided from the alternate power sources 302a-302d. In some examples, if the alternate power sources 302a-302d are unavailable, the bypass relay 308 may be closed to couple the input 102 to the output 116 such that unregulated AC power is provided from the grid to support the load.

Further, being that the alternate power sources 302a-302d are coupled to the DC bus 106 via the DC/DC converters 304a-304d, the DC/AC inverter 114 may function as the constant voltage source allowing DC power to be drawn from the alternate power sources 302a-302d. In some examples, the DC/AC inverter 114 may provide reactive power control of the power drawn from the alternate power sources 302a-302d. As such, DC power may be drawn from the alternate power sources 302a-302d without an active connection to the grid. For example, when grid power is unavailable, the controller 112 may still operate the DC/DC converters 304a-304d such that DC power drawn from the alternate power sources 302a-302d is provided to the DC bus 106. The controller 112 may operate the DC/AC inverter 114 such that the DC power provided to the DC bus 106 from the alternate power sources 302a-302d is converted to AC power and provided to the load. Based on an indication that the alternate power sources 302a-302d are unable to provide a sufficient amount of power to support the load, the controller 112 may operate the DC/DC converter 108 such that DC power is drawn from the battery 110 and provided to the DC bus 106 to supplement the DC power provided from the alternate power sources 302a-302d.

In one example, the controller 112 may operate the DC/DC converters 304a-304d differently based on the power source type of each alternate power source 302a-302d. For example, when grid power is available, the controller 112 may only operate the DC/DC converters 304c and 304d to provide DC power to the DC bus 106 from the alternate power sources 302c, 302d (i.e., renewable power sources) to support the load and/or charge the battery 110. In some examples, when grid power becomes unavailable, the controller 112 may continue to operate the DC/DC converters 304c, 304d to provide DC power from the alternate power sources 302c, 302d during a turn-on time of alternate power sources 302a, 302b (i.e., non-renewable power sources). During this time, the controller 112 may operate the DC/DC converter 108 to provide DC power from the battery 110 to supplement the DC power provided from the alternate power sources 302c, 302d as needed. Once the alternate power sources 302a, 302b are turned on, the controller 112 may continue to operate the DC/DC converters 304c, 304d to draw power from the alternate power sources 304c, 304d. The controller 112 may stop operating the DC/DC converter 108 to draw DC power from the battery 110 and may begin operating the DC/DC converters 304a, 304b to draw DC power from the alternate power sources 302a, 302b to supplement the DC power provided from the alternate power sources 304c, 304d as needed.

In some examples, based on an indication that the battery 110 is at least partially uncharged, the controller 112 may operate the DC/DC converter 108 such that a portion of the power provided to the DC bus 106 by the alternate power sources 304a-304d is provided to the battery 110 for charging. Likewise, if the power drawn from the renewable power sources 302a-302d is insufficient to support the load and provide a minimum charging current to the battery 110, the controller 112 may operate the AC/DC converter 104 such that AC power is drawn from the grid, converted to DC power, and provided to the DC bus 106 to support the load and charge the battery 110.

In some examples, the battery 110 may be capable of receiving a range of charging currents and may charge at a rate proportional to the charge current. As such, it may be advantageous to provide the highest charging current possible to the battery to reduce charge time. For example, the battery 110 may charge faster when receiving a high charge current and slower when receiving a low charge current. As such, both the power supply system 200 of FIG. 2 and the power supply system 300 of FIG. 3 may be configured to charge the battery 110 at a variable charging rate to reduce charge time. In one example, when the battery 110 is at least partially uncharged, the controller 112 may determine the variable charge rate as a function of grid power availability, the output power capability of the renewable/alternate power sources, and the power demand of the load. For example, in the power supply system 200 of FIG. 2, the controller 112 may operate the DC/DC converter 108 such that power drawn from the renewable power sources 202a-202c via the charge controllers 204a-204c is provided to the battery 110 for charging and to the DC bus 106 to support the load. The controller 112 may adjust the operation of the DC/DC converter 108 based on the power demand of the load, such that the battery 110 receives the maximum charging current available. Similarly, in the power supply system 300 of the FIG. 3, the controller 112 may operate the DC/DC converter 108 to increase the charging current drawn from the DC bus 106 when the power demand of the load is low and to decrease the charging current drawn from the DC bus 106 when the power demand of the load is high.

Figure 4:
FIG. 4 is a graph of example power supply system currents according to aspects described herein.
Figure 4:
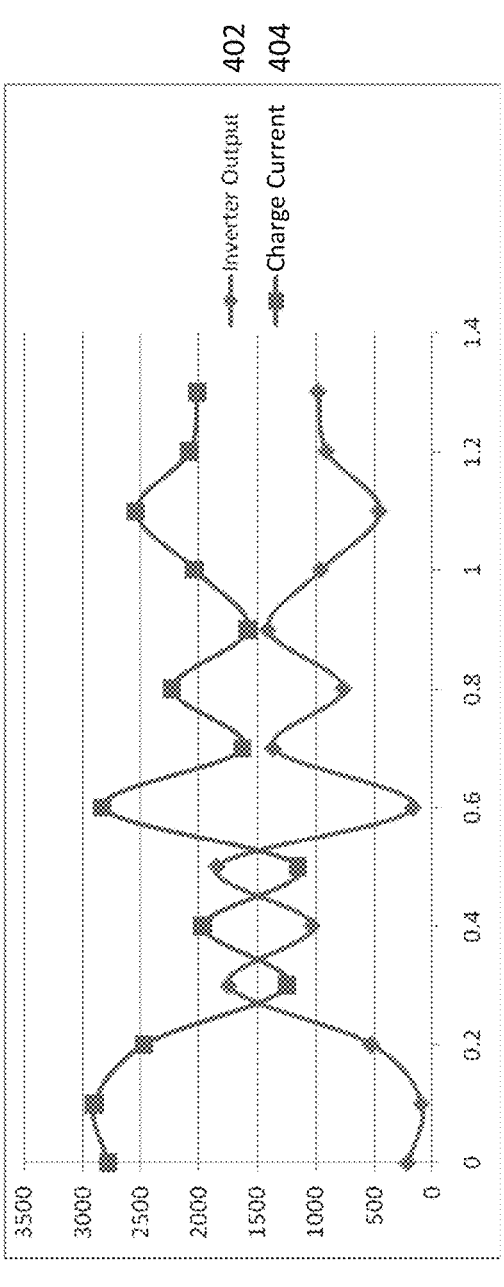

FIG. 4 illustrates a graph 400 showing an example output current 402 and charging current 404. In one example, the output current 402 may be the output current of the DC/AC inverter 114 and the value of the output current 402 may correspond to the power demand of the load coupled to the output 116. Likewise, the charging current 404 may correspond to the current provided to the battery 110 for charging. As shown in FIG. 4, when the output current 402 is low (i.e., load power demand is low), the charging current 404 may be increased to charge the battery 110 at a faster rate. Likewise, when the output current 402 is high (i.e., load power demand is high), the charging current 404 may be reduced to provide uninterrupted support of the load.

In some examples, when the output power capability of the renewable/alternate power sources 202, 302 is insufficient to provide a minimum charging current to the battery 110, the controller 112 may operate the AC/DC converter 104 to draw power from the grid to support the load and charge the battery 110. In such examples, the DC/DC converter 108 may be operated to draw the charging current 404 from the DC bus 106 based on the output current 402 (as shown in FIG. 4). In one example, the peak value of the charging current 404 capable of being provided may correspond to characteristics of the battery 110 and hardware limitations (e.g., current carrying capacity) of components used in the various DC/DC conversion stages (i.e., the charge controllers 204a-204c, DC/DC converters 304a-304d, and the DC/DC converter 108 of the UPS 100).

As described above, the controller 112 is configured to monitor and control operation of the UPS 100. Using data stored in associated memory, the controller 112 is operable to execute one or more instructions that may result in the manipulation of one or more power switches included in the power conversion circuitry of the UPS 100. In some examples, the controller 112 can include one or more processors or other types of controllers. The controller 112 may perform a portion of the functions discussed herein on a processor, and perform another portion using an Application-Specific Integrated Circuit (ASIC) tailored to perform particular operations. Examples in accordance with the present invention may perform the operations described herein using many specific combinations of hardware and software and the invention is not limited to any particular combination of hardware and software components.

In the power supply systems described above, being that AC power is only drawn from the grid to supplement DC power provided from renewable/alternate power sources, energy costs associated with grid power usage can be reduced. In addition, being that fewer conversion stages are utilized to provide DC power from the renewable/alternate power sources to the DC bus 106 (i.e., no AC/DC double conversion), efficiency of the power supply systems may be improved. Likewise, by utilizing fewer conversion stages to provide DC power from the renewable/alternate power sources 202, 302 to the battery 110 for charging, the battery 110 may be charged from the renewable/alternate sources more efficiently.

As described above, systems and methods are provided herein for improved utilization of renewable power sources with UPS's. In at least one embodiment, power drawn from renewable power sources may be provided directly to the battery or DC bus of a UPS, without a dependence on grid availability. In some embodiments, by providing the power drawn from the renewable power sources directly to the battery or the DC bus, the number of power conversion stages utilized to support the load or charge the battery using power from the renewable power sources may be reduced, improving efficiency.

What is claimed is:

1. A power supply system comprising:

an input coupled to an AC power source and configured to receive input AC power from the AC power source;

an output configured to provide AC output power to a load;

a converter coupled to the input;

an inverter coupled to the output;

a DC bus coupled between the converter and the inverter;

a first alternate power interface coupled to the DC bus and configured to be coupled to a first alternate power source of a first type through a first DC/DC converter;

a second alternate power interface coupled to the DC bus and configured to be coupled to a second alternate power source of a second type through a second DC/DC converter, the second type being different from the first type; and at least one controller configured to be communicatively coupled to the input, the first DC/DC converter, and the second DC/DC converter, the at least one controller being configured to determine the input AC power from the AC power source received at the input, in response to determining that the input AC power is above an input power threshold, operate the first DC/DC converter to provide DC power derived from the first alternate power source to the DC bus through the first alternate power interface, and in response to determining that the input AC power is below the input power threshold, operate the first DC/DC converter to provide DC power derived from the first alternate power source to the DC bus through the first alternate power interface and operate the second DC/DC converter to provide DC power derived from the second alternate power source to the DC bus through the second alternate power interface.

2. The power supply system of claim 1, further comprising an energy storage device interface coupled to the DC bus, the first alternate power interface, and the second alternate power interface, and configured to be coupled to an energy storage device through a third DC/DC converter, wherein the at least one controller is further configured to in response to determining that the input AC power is below the input power threshold, operate the third DC/DC converter to provide DC power derived from the energy storage device to the DC bus during a turn-on time of the second alternate power source.

3. The power supply system of claim 2, wherein the at least one controller is further configured to stop operating the third DC/DC converter to provide DC power derived from the energy storage device to the DC bus in response to the second alternate power source being turned on.

4. The power supply system of claim 2, wherein the at least one controller is further configured to determine a charge level of the energy storage device;

determine a load demand at the output; and in response to determining the charge level of the energy storage device is at least partially uncharged, operate the third DC/DC converter to provide a variable charging current to the energy storage device, a magnitude of the variable charging current set by the at least one controller to a first non-zero value based on the load demand being at a first level and the magnitude of the variable charging current set by the at least one controller to a second non-zero value based on the load demand being at a second level.

5. The power supply system of claim 1, wherein the at least one controller is further configured to:

monitor the DC bus to determine total DC power derived from the first alternate power source and the second alternate power source to the DC bus;

determine a load demand at the output; and in response to determining the total DC power derived from the first alternate power source and the second alternate power source to the DC bus is sufficient to support the load demand, operate the converter to stop drawing AC power from the AC power source.

6. The power supply system of claim 5, further comprising a bypass line coupled between the input and the output, the bypass line including a bypass relay to selectively couple the input to the output.

7. The power supply system of claim 6, wherein the at least one controller is further configured to:

operate, in response to determining the total DC power derived from the first alternate power source and the second alternate power source to the DC bus is in excess of a level sufficient to support the load demand, the bypass relay to couple the input to the output such that excess AC power, derived from the first alternate power source and/or the second alternate power source to the DC bus, is provided to the input.

8. The power supply system of claim 1, wherein the first type is a renewable power type, and the second type is a non-renewable power type.

9. The power supply system of claim 8, wherein the first DC/DC converter is a maximum power point tracking (MPPT) controller, and the second DC/DC converter is a full bridge or flyback converter.

10. The power supply system of claim 9, wherein the MPPT controller is configured to provide maximum power point tracking information of the first alternate power source to the at least one controller, and the at least one controller is further configured to operate the MPPT controller to provide the DC power derived from the first alternate power source to the DC bus based on the maximum power point tracking information.

11. The power supply system of claim 8, wherein the renewable power type includes photovoltaics, and the non-renewable power type includes fuel cells.

12. A power supply system comprising:

an input coupled to an AC power source and configured to receive input AC power from the AC power source;

an output configured to provide AC output power to a load;

a converter coupled to the input;

an inverter coupled to the output;

a DC bus coupled between the converter and the inverter;

a first alternate power interface coupled to the DC bus and configured to be coupled to a first alternate power source of a first type through a first DC/DC converter;

a second alternate power interface coupled to the DC bus and configured to be coupled to a second alternate power source of a second type through a second DC/DC converter, the second type being different from the first type; and at least one controller configured to be communicatively coupled to the output, the first DC/DC converter, and the second DC/DC converter, the at least one controller being configured to determine a load demand at the output, in response to determining that the load demand is below a load demand threshold, operate the first DC/DC converter to provide DC power derived from the first alternate power source to the DC bus through the first alternate power interface, and in response to determining that the load demand is above the load demand threshold, operate the first DC/DC converter to provide DC power derived from the first alternate power source to the DC bus through the first alternate power interface and operate the second DC/DC converter to provide DC power derived from the second alternate power source to the DC bus through the second alternate power interface.

13. A non-transitory computer-readable medium storing thereon sequences of computer-executable instructions for controlling a power supply system including an input coupled to an AC source and configured to receive input AC power from the AC source, an output configured to provide output AC power to a load, a converter coupled to the input, an inverter coupled to the output, and a DC bus coupled between the converter and the inverter and configured to be coupled to a first alternate power source through a first DC/DC converter and to a second alternate power source through a second DC/DC converter, the sequences of computer-executable instructions including instructions that instruct at least one processor to:

determine the input AC power from the AC power source received at the input;

in response to determining that the input AC power is above an input power threshold, operate the first DC/DC converter to provide DC power derived from the first alternate power source to the DC bus, the first alternate power source being of a first type; and in response to determining that the input AC power is below the input power threshold, operate the first DC/DC converter to provide DC power derived from the first alternate power source to the DC bus and operate the second DC/DC converter to provide DC power derived from the second alternate power source to the DC bus, the second alternate power source being of a second type different from the first type.

14. The non-transitory computer-readable medium of claim 13, wherein the DC bus is further configured to be coupled to an energy storage device through a third DC/DC converter, and the sequences of instructions include instructions that instruct the at least one processor to in response to determining that the input AC power is below the input power threshold, operate the third DC/DC converter to provide DC power derived from the energy storage device to the DC bus during a turn-on time of the second alternate power source.

15. The non-transitory computer-readable medium of claim 14, wherein the sequences of instructions include instructions that instruct the at least one processor to:

determine a charge level of the energy storage device;

determine a load demand at the output; and in response to determining the charge level of the energy storage device is at least partially uncharged, operate the third DC/DC converter to provide a variable charging current to the energy storage device, setting a magnitude of the variable charging current to a first non-zero value based on the load demand being at a first level and setting the magnitude of the variable charging current to a second non-zero value based on the load demand being at a second level.

16. The non-transitory computer-readable medium of claim 13, wherein the sequences of instructions include instructions that instruct the at least one processor to:

monitor the DC bus to determine total DC power derived from the first alternate power source and the second alternate power source to the DC bus;

determine a load demand at the output; and in response to determining the total DC power derived from the first alternate power source and the second alternate power source to the DC bus is sufficient to support the load demand, operate the converter to stop drawing AC power from the AC power source.

17. The non-transitory computer-readable medium of claim 16, wherein the power supply system further includes a bypass line coupled between the input and the output, the bypass line including a bypass relay to selectively couple the input to the output, and the sequences of instructions include instructions that instruct the at least one processor to operate, in response to determining the total DC power derived from the first alternate power source and the second alternate power source to the DC bus is in excess of a level sufficient to support the load demand, the bypass relay to couple the input to the output such that excess AC power, derived from the first alternate power source and/or the second alternate power source to the DC bus, is provided to the input.

18. The non-transitory computer-readable medium of claim 13, wherein the first type is a renewable power type, and the second type is a non-renewable power type.

19. The non-transitory computer-readable medium of claim 18, wherein the first DC/DC converter is a maximum power point tracking (MPPT) controller, and the second DC/DC converter is a full bridge or flyback converter.

20. The non-transitory computer-readable medium of claim 19, wherein the MPPT controller is configured to provide maximum power point tracking information of the first alternate power source, and the sequences of instructions include instructions that instruct the at least one processor to operate the MPPT controller to provide the DC power derived from the first alternate power source to the DC bus based on the maximum power point tracking information.

* * * * *